UNITED STATES PATENT OFFICE.

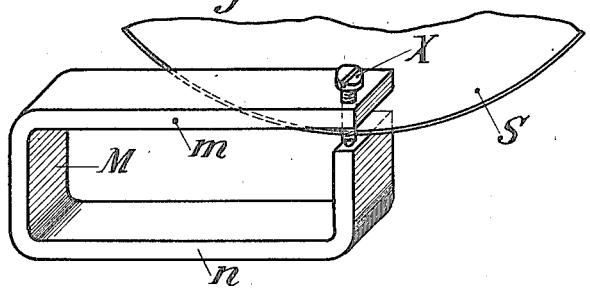
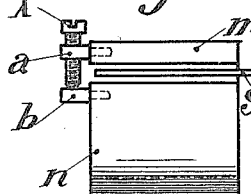
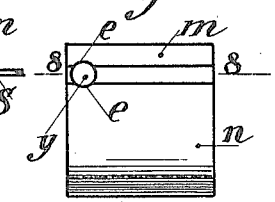
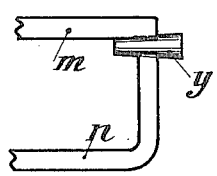
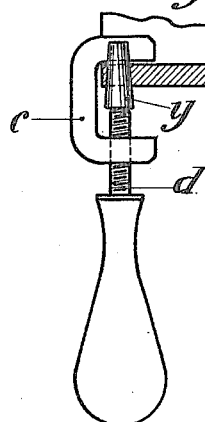
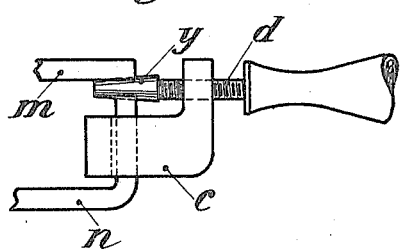

OTTO TITUS BLÁTHY, OF BUDAPEST, HUNGARY.

CALIBRATING ELECTRIC METERS.

1,221,821.  Specification of Letters Patent.  Patented Apr. 10, 1917.

Application filed December 15, 1914. Serial No. 877,419.

*To all whom it may concern:*

Be it known that I, OTTO TITUS BLÁTHY, a subject of the King of Hungary, residing at Budapest, in the Kingdom of Hungary, have invented new and useful Improvements in Calibrating Electric Meters; and I do hereby declare the following to be a full, clear, and exact description of the same.

The adjustment of electricity-meters by varying the strength of the braking field was hitherto obtained by a displacement of the braking magnets. With the object of avoiding the disadvantages of this method it has been proposed to employ a magnetic shunt and to vary either the sectional area of the shunt member or its distance from the magnet coils until the desired strength of the braking field was reached. Compared with this method the present invention represents a simplification, as it allows of performing the adjustment of the strength of the braking field, both without changing the fixed position of the braking magnets and without providing magnetic shunts.

According to the present invention a device is provided by means of which the branches of the magnet may be spread more or less far apart from each other or be approached to each other respectively, in order to vary the relative distance between the two pole surfaces of the magnet.

Preferably this distancing device is disposed between the two branches of the braking magnet so that the adjustment of the braking magnets may be performed before the magnets are fitted into the meter, and the braking magnets will retain their adjustment, even after the meter has been dismantled.

As such distancing device sccrews or wedges may be employed, which are preferably disposed as close as possible to the pole surfaces, for example, between the pole surfaces, or also between lugs on the poles of the braking magnet.

In the accompanying drawing several embodiments of the present invention are shown for exemplification.

Fig. 4 is an embodiment, shown in perspective view, in which the distancing screw acts between the pole surfaces of the braking magnet.

Fig. 5 is a modification of the embodiment according to Fig. 4 in end view.

Figs. 6 and 7 are end view and side elevation respectively of an embodiment in which a wedge is employed as distancing device.

Fig. 8 is a horizontal section on the line 8—8 in Fig. 6, and Fig. 9 is a side elevation of the same embodiment, with the tool for adjusting the wedge attached.

Figure 1:
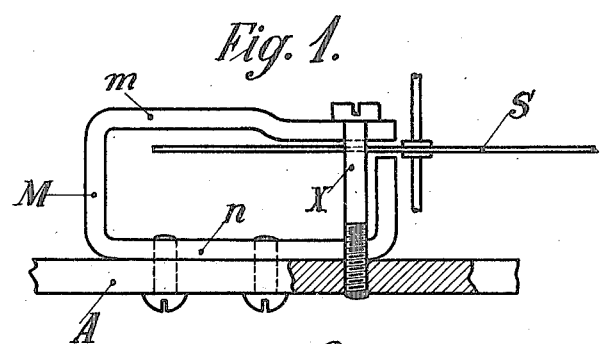
Figure 1 is a side elevation.
Figure 2:
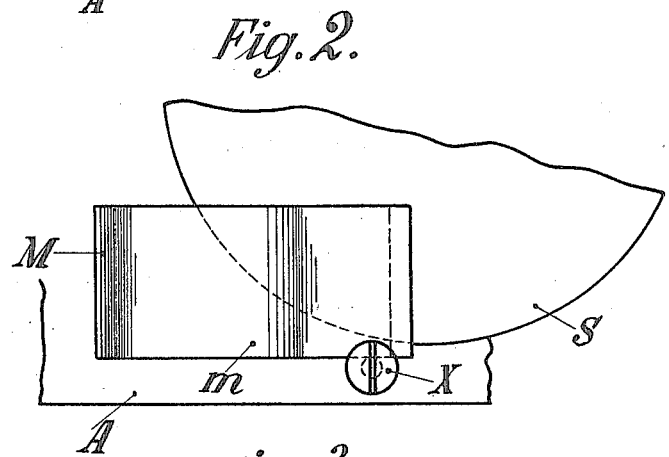
Fig. 2 is a plan of the one embodiment, in which the distancing screws are disposed independent of the braking magnet.

In Figs. 1 and 2 the reference letter M indicates the braking magnet, which is secured with its lower branch $n$ to the carrier A and acts on the braking disk $s$ of the meter. The distancing device in this embodiment consists of a screw $x$ which is screwed into a female thread in the carrier A next to the braking magnet and close to its poles in such a manner, that the head of the screw $x$ bears against the upper side of the upper branch $m$ of the magnet. When the screw is screwed down, the head of said screw will force the branch $m$ of the magnet downward, and this branch $m$ will elastically yield within the range of the desired adjustment, so that the pole surfaces of the magnet are approached toward each other and the strength of the braking field is intensified. For adjusting the meter the screw is screwed down so far until the meter runs synchronously with a standard meter. The braking magnet is so dimensioned that at the distance, which the pole surfaces assume, when the distancing device is disengaged, the magnet is somewhat too weak, so that the adjustment will always have to be obtained by intensifying the strength of the braking field. With this arrangement the braking magnet must be adjusted after it has been fitted into the meter, and will have to be repeated when the meter is dismantled.

However, when the distancing device is disposed between the two branches of the braking magnet, the magnet will retain the adjustment, when once adjusted, so that such adjustment may be performed before the magnet is fitted into the meter, and need neither be repeated when the meter is dismantled, as such an adjustment remains permanent.

Figure 3:
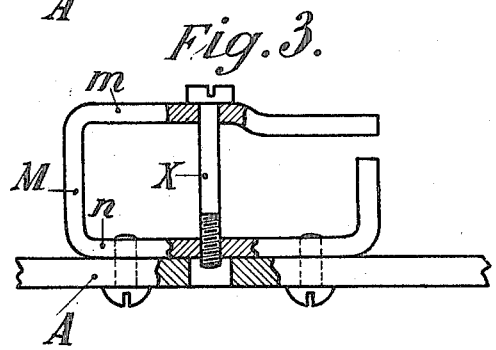
Fig. 3 is a side elevation of an embodiment in which the distancing screw acts on the two branches of the magnet.

According to Fig. 3 the distancing screw $x$ fits loosely in a bore in the one branch of the magnet $m$ and screws in a female thread in the other branch of the magnet $n$, so that when the screw $x$ is screwed down, the two branches of the magnet, $m$ and $n$ respectively are approached to each other.

According to Fig. 4 the screw $x$ disposed between the branches of the magnet is situated close to the poles of the steel magnet M and screws in a threaded bore in the branch $m$ of the magnet, bearing with its end against the pole surface of the other branch $n$, so that when the screw $x$ is screwed down, the two branches $m$ and $n$ of the steel magnet are spread apart and will yield by their elasticity. Thereby the air gap between the poles of the magnet M is enlarged and the field acting on the braking disk $s$ of the meter is reduced. With this arrangement the braking magnets must be somewhat stronger than is necessary for obtaining the desired braking effect.

According to Fig. 5 lugs $a$ and $b$ are provided close to the poles of the magnet. The distancing screw $x$ is screwed through a female thread in the one lug $a$ and bears against the other lug $b$.

In place of a screw also wedges may be employed for spreading the two branches $m$ and $n$ of the magnet apart, as illustrated in Figs. 6 and 7. Here a wedge $y$ is driven into conical grooves $e$ in the pole surfaces, whereby the two branches $m$ and $n$ of the magnet are forced apart.

For driving in the wedge by the exact distance required a screw-jack $c$, $d$ may be employed (see Figs. 8 and 9). The bow $o$ of the screw-jack is fitted on the vertical part of the one branch $n$ of the magnet, whereupon, by turning the screw $d$ the wedge may be driven in until the desired correction of the meter is obtained. Then the screw $d$ is screwed back and the jack $c$ is removed.

The wedge $y$ may, similar to the screw $x$ in Fig. 5 also be disposed to engage between two lugs provided on the branches of the magnet.

By means of the hereinbefore described distancing devices the adjustment of the meters may be performed in an easy, rapid and accurate manner.

What I claim as my invention, and desire to secure by Letters Patent of the United States, is:

1. An electric meter having a rotating part; a brake disk mounted on said rotatable part; a permanent magnet between the pole pieces of which said disk revolves; and a screw engaging both legs of the magnet and adapted to regulate the distance between the pole surfaces more or less owing to the resiliency of the magnet.

2. An electric meter having a rotating part; a brake disk mounted on said rotatable part; an easily removable permanent magnet between the pole pieces of which said disk revolves; and a screw engaging both legs of the magnet and adapted to regulate the distance between the pole surfaces more or less.

In testimony whereof, I have signed my name to this specification in the presence of two subscribing witnesses.

OTTO TITUS BLÁTHY.

Witnesses:
  EUGEN HANSAUYE,
  EHRENSTEIN WIR.